(12) United States Patent
Bowers

(10) Patent No.: US 11,091,368 B2
(45) Date of Patent: Aug. 17, 2021

(54) METHODS AND SYSTEMS FOR RECOVERING PHOSPHORUS FROM WASTEWATER INCLUDING DIGESTATE RECYCLE

(71) Applicant: Ostara Nutrient Recovery Technologies Inc., Vancouver (CA)

(72) Inventor: Keith E. Bowers, Seattle, WA (US)

(73) Assignee: Ostara Nutrient Recovery Technologies Inc., Vancouver (CA)

( * ) Notice: Subject to any disclaimer, the term of this patent is extended or adjusted under 35 U.S.C. 154(b) by 436 days.

(21) Appl. No.: 16/255,898

(22) Filed: Jan. 24, 2019

(65) Prior Publication Data

US 2019/0225495 A1     Jul. 25, 2019

Related U.S. Application Data

(62) Division of application No. 13/820,023, filed as application No. PCT/US2011/049784 on Aug. 30, 2011, now Pat. No. 10,189,711.

(60) Provisional application No. 61/486,115, filed on May 13, 2011, provisional application No. 61/378,273, filed on Aug. 30, 2010.

(51) Int. Cl.
| | | |
|---|---|---|
| *C01B 25/45* | (2006.01) | |
| *C02F 1/52* | (2006.01) | |
| *C02F 3/28* | (2006.01) | |

(52) U.S. Cl.
CPC .......... *C01B 25/451* (2013.01); *C02F 1/5254* (2013.01); *C02F 3/28* (2013.01)

(58) Field of Classification Search
CPC ......... C01B 25/451; C02F 1/5254; C02F 3/28
See application file for complete search history.

(56) References Cited

U.S. PATENT DOCUMENTS

| | | |
|---|---|---|
| 3,348,910 A | 10/1967 | Goodenough et al. |
| 3,585,020 A | 6/1971 | Legal, Jr. et al. |
| 4,402,986 A | 9/1983 | Sinkoff |
| 5,126,049 A | 6/1992 | Hallberg |
| 5,360,546 A | 11/1994 | Tomita et al. |
| 7,604,740 B2 | 10/2009 | Baur |
| 7,789,932 B2 | 9/2010 | Anderson et al. |
| 8,747,672 B2 | 6/2014 | Bowers |
| 9,334,166 B2 | 5/2016 | Bowers |
| 10,099,926 B2 | 10/2018 | Bowers |
| 2003/0217968 A1 | 11/2003 | Goel et al. |
| 2005/0016919 A1 | 1/2005 | Hagino |
| 2005/0051495 A1 | 3/2005 | Bowers |

(Continued)

FOREIGN PATENT DOCUMENTS

| | | |
|---|---|---|
| EP | 1 698 595 A1 | 9/2006 |
| JP | 11-010194 A | 1/1999 |

(Continued)

OTHER PUBLICATIONS

International Search Report and Written Opinion dated Feb. 9, 2012, issued in corresponding International Application No. PCT/US2011/036514, filed May 13, 2011, 11 pages.

(Continued)

*Primary Examiner* — Dirk R Bass
(74) *Attorney, Agent, or Firm* — Oyen Wiggs Green & Mutala LLP

(57) ABSTRACT

Methods and systems for removal and recovery of phosphorus from wastewater and producing inorganic phosphorus complexes including digestate recycle.

9 Claims, 6 Drawing Sheets

(56) References Cited

U.S. PATENT DOCUMENTS

| | | |
|---|---|---|
| 2005/0279475 A1 | 12/2005 | Fournier et al. |
| 2007/0000836 A1 | 1/2007 | Elefritz, Jr. et al. |
| 2007/0044526 A1 | 3/2007 | Cabello-Fuentes |
| 2008/0308505 A1 | 12/2008 | Jansen |
| 2009/0013742 A1 | 1/2009 | Zhang |
| 2009/0078646 A1 | 3/2009 | Curtis et al. |
| 2009/0194476 A1 | 8/2009 | Baur |
| 2010/0170845 A1 | 7/2010 | Baur |
| 2012/0031849 A1 | 2/2012 | Britton |
| 2012/0261334 A1 | 10/2012 | Baur |
| 2012/0261338 A1 | 10/2012 | Kuzma |
| 2013/0062289 A1 | 3/2013 | Cote |

FOREIGN PATENT DOCUMENTS

| | | |
|---|---|---|
| KR | 10-0837698 B1 | 6/2008 |
| WO | 2005/049511 A1 | 6/2005 |
| WO | 2005/077834 A1 | 8/2005 |
| WO | 2008/108599 A1 | 9/2008 |
| WO | 2009/031796 A2 | 3/2009 |
| WO | 2011/143610 A2 | 11/2011 |
| WO | 2012/030847 A2 | 3/2012 |
| WO | 2012/030857 A2 | 3/2012 |

OTHER PUBLICATIONS

International Search Report and Written Opinion dated May 1, 2012, issued in related International Application No. PCT/US2011/049769, filed Aug. 30, 2011, 9 pages.

International Preliminary Report on Patentability dated Jan. 11, 2013, issued in related International Application No. PCT/US2011/049769, filed Aug. 30, 2011, 4 pages.

International Preliminary Report on Patentability dated Mar. 14, 2013, issued in corresponding International Application No. PCT/US2011/049784, filed Aug. 30, 2011, 8 pages.

International Search Report and Written Opinion dated Oct. 4, 2012, issued in related International Application No. PCT/US2012/023882, filed Feb. 3, 2012, 7 pages.

International Search Report and Written Opinion dated Apr. 20, 2012, issued in corresponding International Application No. PCT/US2011/049784, filed Aug. 30, 2011, 9 pages.

METHODS AND SYSTEMS FOR RECOVERING PHOSPHORUS FROM WASTEWATER INCLUDING DIGESTATE RECYCLE

CROSS REFERENCES TO RELATED APPLICATIONS

This application is a division of U.S. application Ser. No. 13/820,023, filed May 14, 2013, which is the national phase of International Application No. PCT/US2011/049784, filed Aug. 30, 2011, which claims the benefit of U.S. Application No. 61/486,115, filed May 13, 2011, and U.S. Application No. 61/378,273, filed Aug. 30, 2010, each expressly incorporated herein by reference in its entirety.

BACKGROUND OF THE INVENTION

The presence of dissolved phosphate in industrial effluents and wastewater is a long-standing problem in the art. Phosphorus (referred to herein as "P") is a non-renewable resource and an important non-substitutable macronutrient, existing in nature as phosphates in various inorganic or organic forms, and ranging from the simple to the very complex in terms of molecular structure. Because P is essential for all biological processes, there is concern that the current demand and exploitation (total annual production is about 20 million tons of P, derived from roughly 140 million tons of rock concentrates) of this non-renewable resource is not sustainable. Nearly all the P used globally is mined from a relatively small number of commercially-exploitable deposits, and it has been estimated that the global economic P reserves may last about 100 years at the current rate of extraction. Therefore, the world's P resources are finite and should be used efficiently and in a sustainable way. Additionally, aside from the non-renewable resource aspect, there is need to improve P management, particularly from the environment protection perspective because, for example, P-enrichment in receiving waters is associated with harmful algae blooms that affect the health and vitality of wetlands and marine environments. Therefore, there is a pronounced need in the art to develop methods for increasing the life expectancy of the world's limited P resources. There is a pronounced need in the art to develop methods for recovery and recycling of P from industrial effluents and wastewater.

Art-recognized P removal technologies applied to wastewater include chemical and biological processes. One chemical technology for P removal and recovery is crystallization of P in the form of struvite (magnesium ammonium phosphate hexahydrate or $MgNH_4PO_4 \cdot 6H_2O$). Struvite is crystalline and thus well suited for formation from effluent streams. In addition, as a granular product struvite is more compact than other chemical precipitates, and it performs well as a slow-release fertilizer. Struvite formation requires reaction between three soluble ions in solution, $Mg^{2+}$, $NH_4^+$ and $PO_4^{3-}$, to form precipitates with low solubility (struvite has a $pK_{sp}$ of 12.6). Struvite precipitation is controlled by pH, supersaturation, and presence of impurities, such as calcium. High pH (e.g., pH 8.5) and supersaturation of the three ions are favorable to struvite formation.

As part of secondary sewage treatment, primary treated sewage is treated with air or oxygen. In the activated sludge process, microorganisms utilize oxygen to metabolize the incoming waste sewage thereby forming a mixture of microorganisms and sewage (mixed liquor). This mixture is conducted to settling tanks for concentration to provide concentrated activated sludge. A majority of the sludge is returned to the activated sludge process and a separate portion of this sludge (waste activated sludge) is removed from the activated sludge process and conducted to a sludge handling system for further treatment and disposal.

In a typical wastewater treatment process, waste activated sludge is conducted to a first solids separation (centrifuge or other thickening apparatus) for thickening, where the liquids are tapped off and returned to the wastewater plant for treatment and the resultant thickened sludge is conducted to an anaerobic digester with other sludge where it remains for a period of time before being conducted to a second solids separation (centrifuge or other dewatering apparatus) for dewatering. Struvite tends to form in the digester and other downstream equipment because of the ammonia, magnesium and phosphorus present in the process streams. This struvite is impractical to harvest and also has the deleterious effect of being deposited on surfaces in the process system components.

Despite the advances in removing phosphorus from wastewater through the formation and recovery of struvite, a need exists for improved methods and systems for wastewater treatment and struvite recovery that eliminate or significantly reduce nuisance struvite formation. The present invention seeks to fulfill this need and provides further related advantages.

SUMMARY OF THE INVENTION

In one aspect, the invention provides methods for treating wastewater and producing inorganic phosphorus.

In one embodiment, the invention provides a method for treating wastewater and producing inorganic phosphorus, comprising:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to an inorganic phosphorus reactor to provide inorganic phosphorus;

(d) anaerobically treating the phosphorus- and magnesium-reduced mixture to provide an ammonia-rich, phosphorus- and magnesium-reduced product; and (e) conducting at least a portion of the ammonia-rich, phosphorus- and magnesium-reduced product to the treated mixture prior to solids separation in step (b).

In one embodiment, the portion of the ammonia-rich, phosphorus- and magnesium-reduced product that is conducted to the treated mixture prior to solids separation in step (b) is an ammonia-rich, phosphorus- and magnesium-reduced liquid produced by solids separation of the ammonia-rich, phosphorus- and magnesium-reduced product. In one embodiment of this method, the method further comprises conducting at least a portion of the ammonia-rich, phosphorus- and magnesium-reduced liquid to a second inorganic phosphorus reactor to provide inorganic phosphorus.

In one embodiment, the portion of the ammonia-rich, phosphorus- and magnesium-reduced product that is conducted to the treated mixture prior to solids separation in step (b) is drawn directly from the ammonia-rich, phosphorus- and magnesium-reduced mixture conducted from the digester. In one embodiment of this method, the method further comprises conducting at least a portion of the ammonia-rich, phosphorus- and magnesium-reduced product to solids separation to provide an ammonia-rich, phosphorus- and magnesium-reduced liquid; and optionally conducting the ammonia-rich, phosphorus- and magnesium-reduced liquid to a second inorganic phosphorus reactor to provide inorganic phosphorus.

In another embodiment, the invention provides a method for treating wastewater and producing inorganic phosphorus, comprising:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to an inorganic phosphorus reactor to provide inorganic phosphorus;

(d) anaerobically treating the phosphorus- and magnesium-reduced mixture to provide an ammonia-rich, phosphorus- and magnesium-reduced mixture; and (e) separating the ammonia-rich, phosphorus- and magnesium-reduced mixture to provide biosolids and an ammonia-rich, phosphorus- and magnesium-reduced liquid; and (f) conducting the ammonia-rich, phosphorus- and magnesium-reduced liquid to the treated mixture prior to solids separation in step (b).

In one embodiment, the method further comprises adjusting the pH of the contents of the inorganic phosphorus reactor. In one embodiment, the method further comprises adding magnesium to the contents of the inorganic phosphorus reactor. In one embodiment, the method further comprises conducting liquid from the inorganic phosphorus reactor to the process headworks.

In another embodiment, the invention provides a method for treating wastewater and producing inorganic phosphorus, comprising:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to an inorganic phosphorus reactor to provide inorganic phosphorus;

(d) anaerobically treating the phosphorus- and magnesium-reduced mixture to provide an ammonia-rich, phosphorus- and magnesium-reduced mixture;

(e) separating the ammonia-rich, phosphorus- and magnesium-reduced mixture to provide biosolids and an ammonia-rich, phosphorus- and magnesium-reduced liquid;

(f) conducting at least a first portion the ammonia-rich, phosphorus- and magnesium-reduced liquid to the treated mixture prior to solids separation in step (b); and (g) optionally conducting at least a second portion of the ammonia-rich, phosphorus- and magnesium-reduced liquid to a second inorganic phosphorus reactor to provide inorganic phosphorus.

In certain embodiments, the method further comprises adjusting the pH of the contents of one or both of the inorganic phosphorus reactors. In certain embodiments, the method further comprises adding magnesium to the contents of one or both of the inorganic phosphorus reactors. In certain embodiments, the method further comprises conducting liquid from one or both of the inorganic phosphorus reactors to the process headworks.

In a further embodiment, the invention provides a method for treating wastewater and producing inorganic phosphorus, comprising:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to a first inorganic phosphorus reactor to provide inorganic phosphorus;

(d) anaerobically treating the phosphorus- and magnesium-reduced mixture to provide an ammonia-rich, phosphorus- and magnesium-reduced mixture;

(e) conducting at least a first portion of the ammonia-rich, phosphorus- and magnesium-reduced mixture to the treated mixture prior to solids separation in step (b);

(f) separating at least a second portion of the ammonia-rich, phosphorus- and magnesium-reduced mixture to provide biosolids and an ammonia-rich, phosphorus- and magnesium-reduced liquid; and (g) optionally conducting the ammonia-rich, phosphorus- and magnesium-reduced liquid to a second inorganic phosphorus reactor to provide inorganic phosphorus.

In certain embodiments, the method further comprises adjusting the pH of the contents of one or both of the inorganic phosphorus reactors. In certain embodiments, the method further comprises adding magnesium to the contents of one or both of the inorganic phosphorus reactors. In certain embodiments, the method further comprises conducting liquid from one or both of the inorganic phosphorus reactors to the process headworks.

In another aspect, the invention provides systems for treating wastewater and producing inorganic phosphorus.

In one embodiment, the invention provides a system for treating wastewater and producing inorganic phosphorus, comprising:

(a) a first conduit for introducing a material into a first solids separator;

(b) a first solids separator for separating the material into a first liquid and a first mixture;

(c) an inorganic phosphorus reactor for making inorganic phosphorus;

(d) a second conduit intermediate the first solids separator and the inorganic phosphorus reactor for conducting the first liquid from the first solids separator to the inorganic phosphorus reactor;

(e) a digester for anaerobically treating the first mixture to provide a second mixture;

(f) a third conduit intermediate the first solids separator and the digester for conducting the first mixture from the first solids separator to the digester;

(g) a second solids separator for separating the second mixture into a second liquid and biosolids;

(h) a fourth conduit intermediate the digester and the second solids separator for conducting the second mixture from the digester to the second solids separator; and (i) a fifth conduit intermediate the second solids separator and the first conduit for conducting the second liquid to the first conduit to combine the second liquid with the material.

In another embodiment, the invention provides a system for treating wastewater and producing inorganic phosphorus, comprising:

(a) a first conduit for introducing a material into a first solids separator;

(b) a first solids separator for separating the material into a first liquid and a first mixture;

(c) a first inorganic phosphorus reactor for making inorganic phosphorus;

(d) a second conduit intermediate the first solids separator and the first inorganic phosphorus reactor for conducting the first liquid from the first solids separator to the first inorganic phosphorus reactor;

(e) a digester for anaerobically treating the first mixture to provide a second mixture;

(f) a third conduit intermediate the first solids separator and the digester for conducting the first mixture from the first solids separator to the digester;

(g) a second solids separator for separating the second mixture into a second liquid and biosolids;

(h) a fourth conduit intermediate the digester and the second solids separator for conducting the second mixture from the digester to the second solids separator;

(i) a second inorganic phosphorus reactor for making inorganic phosphorus;

(j) a fifth conduit intermediate the second solids separator and the first conduit for conducting a first portion of the second liquid from the second solids separator to the first conduit to combine the second liquid with the material; and (k) a sixth conduit intermediate the second solids separator and the second inorganic phosphorus reactor for conducting a second portion of the second liquid to the second inorganic phosphorus reactor.

In a further embodiment, the invention provides a system for treating wastewater and producing inorganic phosphorus, comprising:

(a) a first conduit for introducing a material into a first solids separator;

(b) a first solids separator for separating the material into a first liquid and a first mixture;

(c) a first inorganic phosphorus reactor for making inorganic phosphorus;

(d) a second conduit intermediate the first solids separator and the first inorganic phosphorus reactor for conducting the first liquid from the first solids separator to the first inorganic phosphorus reactor;

(e) a digester for anaerobically treating the first mixture to provide a second mixture;

(f) a third conduit intermediate the first solids separator and the digester for conducting the first mixture from the first solids separator to the digester;

(g) a fourth conduit intermediate the digester and the first conduit for conducting a first portion of the second mixture from the digester to the first conduit to combine the second mixture with the material;

(h) a second solids separator for separating a second portion of the second mixture into a second liquid and biosolids;

(i) a fifth conduit intermediate the digester and the second solids separator for conducting the second portion of the second mixture from the digester to the second solids separator;

(j) a second inorganic phosphorus reactor for making inorganic phosphorus; and (k) a sixth conduit intermediate the second solids separator and the second inorganic phosphorus reactor for conducting the second liquid to the second inorganic reactor.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

Figure 1:
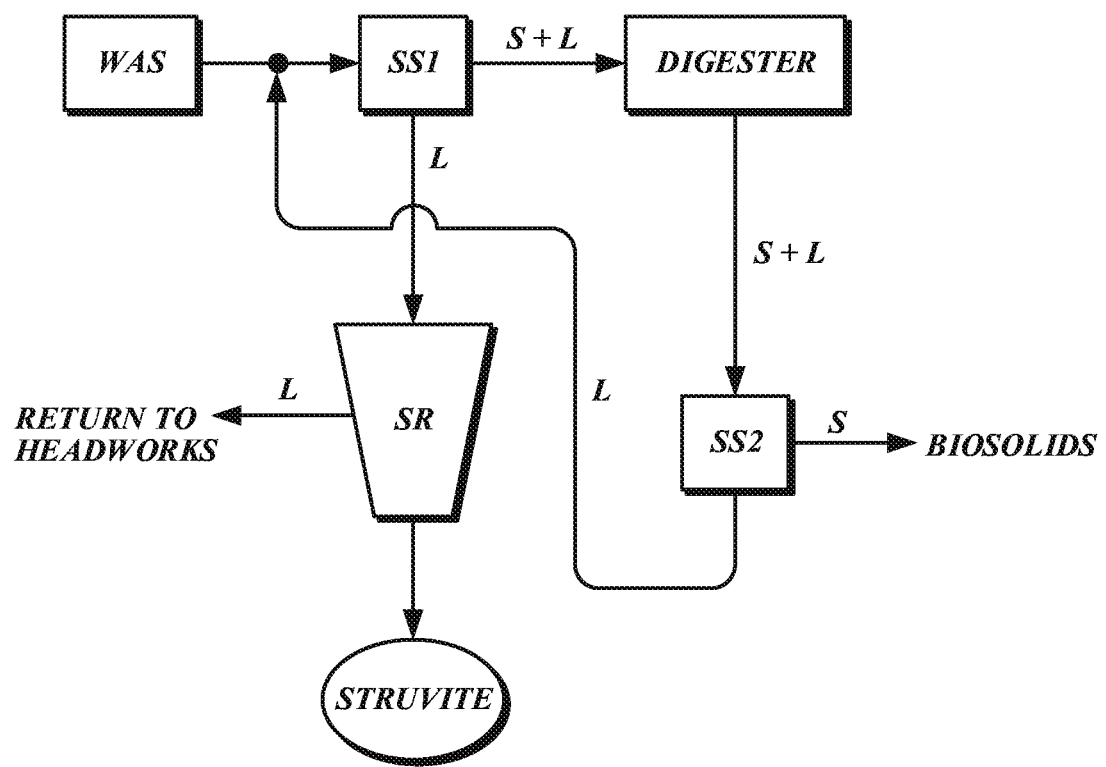
FIG. 1 is a schematic illustration of a representative method of the invention for treating wastewater and producing inorganic phosphorus.

The invention provides methods and systems for removing and recovering of phosphorus from wastewater through the formation of inorganic phosphorus (e.g., struvite). The methods and systems advantageously remove phosphorus from wastewater treatment streams and provide inorganic phosphorus as a valuable byproduct.

In typical a wastewater treatment process, phosphorus removal from wastewater is ultimately accomplished by the generation of phosphorus-containing biosolids that are removed from the system. In the typical process, microorganisms are induced to grow, thereby taking up phosphorus into their cell mass. These microorganisms are then separated from the wastewater in the form of waste activated sludge ("WAS"), thereby removing the phosphorus from the wastewater. To reduce the volume of the sludge, it is anaerobically digested, which, unfortunately, releases some of the phosphorus from the cells. Thus, when the digestate is then subjected to solids separation to extract the phosphorus-containing biosolids, the liquid exiting the solids separation also contains some amount of phosphorus, which must be recycled to the headworks. Disadvantages of this typical process include an increased demand on the biological phosphorus release step (due to the recycled phosphorus) and the formation of phosphorus-containing biosolids, which must be disposed of in an acceptable manner that depends on the biosolids' phosphorus content.

The present invention provides an alternative to conventional wastewater treatment processes and advantageously provides for efficient and effective phosphorus removal from wastewater. The invention provides for the formation of an inorganic phosphorus product (i.e., struvite) from wastewater process streams thereby efficiently and effectively removing phosphorus from the process streams. Removal of phosphorus from the process streams by the methods and systems of the invention reduces the amount of phosphorus recycled to the process headworks. This in turn decreases the phosphorus load on the biological phosphorus release step. Furthermore, phosphorus removal from the process streams by the methods and systems of the invention also reduces the amount of phosphorus in the bio solids. A third benefit associated with the methods and systems of the invention is that through phosphorus removal, the formation of nuisance struvite, struvite that is impractical to harvest and that has a deleterious effect once deposited on process system component surfaces, is substantially minimized. Because of the significance and benefits of phosphorus removal, the methods and systems of the invention offer an advantageous alternative to conventional wastewater treatment processes.

The present invention also specifically addresses the problems of nuisance struvite formation and external alkalinity demand associated with conventional wastewater treatment processes.

In a typical wastewater treatment process, waste activated sludge is conducted to a solids separation for thickening, where the liquids are tapped off and returned to the wastewater plant for treatment and the resultant thickened sludge is conducted to an anaerobic digester with other sludge where it remains for a period of time before being conducted to a second solids separation. Struvite tends to form in the digester and other downstream equipment because of the presence of ammonia, magnesium, and phosphorus under pH conditions effective for its formation.

In the methods and systems of the invention, the alkalinity of the process stream entering the first solids separation step, and consequently the digester, is increased by recycling at least a portion of the alkaline product produced by the digester to the first solids separator. The increase in alkalinity is effective to resist pH depression in the digester, maintaining pH conditions required for effective digestion, and prevents the digestion from "souring out."

In the practice of the present invention, at least a portion of the alkaline ammonia-rich, phosphorus- and magnesium-reduced product produced from anaerobic digestion is conducted to and combined with the phosphorus- and magnesium-containing treated mixture produced from microorganism phosphorus release prior to the first solids separation. As noted above, the introduction of this alkaline material to the treated mixture significantly reduces the alkaline demand (i.e., satisfies or reduces the need of adding an alkaline material, such as magnesium hydroxide, to the digester or to its inflow) prior to the first solids separation and eliminates or significantly reduces nuisance struvite formation in downstream processing due to the reduction in magnesium input.

In one embodiment, the invention provides a method for treating wastewater and producing inorganic phosphorus, comprising:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to an inorganic phosphorus reactor to provide inorganic phosphorus;

(d) anaerobically treating the phosphorus- and magnesium-reduced mixture to provide an ammonia-rich, phosphorus- and magnesium-reduced product; and (e) conducting at least a portion of the ammonia-rich, phosphorus- and magnesium-reduced product to the treated mixture prior to solids separation in step (b).

In one embodiment, the portion of the ammonia-rich, phosphorus- and magnesium-reduced product that is conducted to the treated mixture prior to solids separation in step (b) is an ammonia-rich, phosphorus- and magnesium-reduced liquid produced by solids separation of the ammonia-rich, phosphorus- and magnesium-reduced product. In one embodiment of this method, the method further comprises conducting at least a portion of the ammonia-rich, phosphorus- and magnesium-reduced liquid to a second inorganic phosphorus reactor to provide inorganic phosphorus.

In one embodiment, the portion of the ammonia-rich, phosphorus- and magnesium-reduced product that is conducted to the treated mixture prior to solids separation in step (b) is drawn directly from the ammonia-rich, phosphorus- and magnesium-reduced mixture conducted from the digester. In one embodiment of this method, the method further comprises conducting at least a portion of the ammonia-rich, phosphorus- and magnesium-reduced product to solids separation to provide an ammonia-rich, phosphorus- and magnesium-reduced liquid; and optionally conducting the ammonia-rich, phosphorus- and magnesium-reduced liquid to a second inorganic phosphorus reactor to provide inorganic phosphorus.

Figure 2:
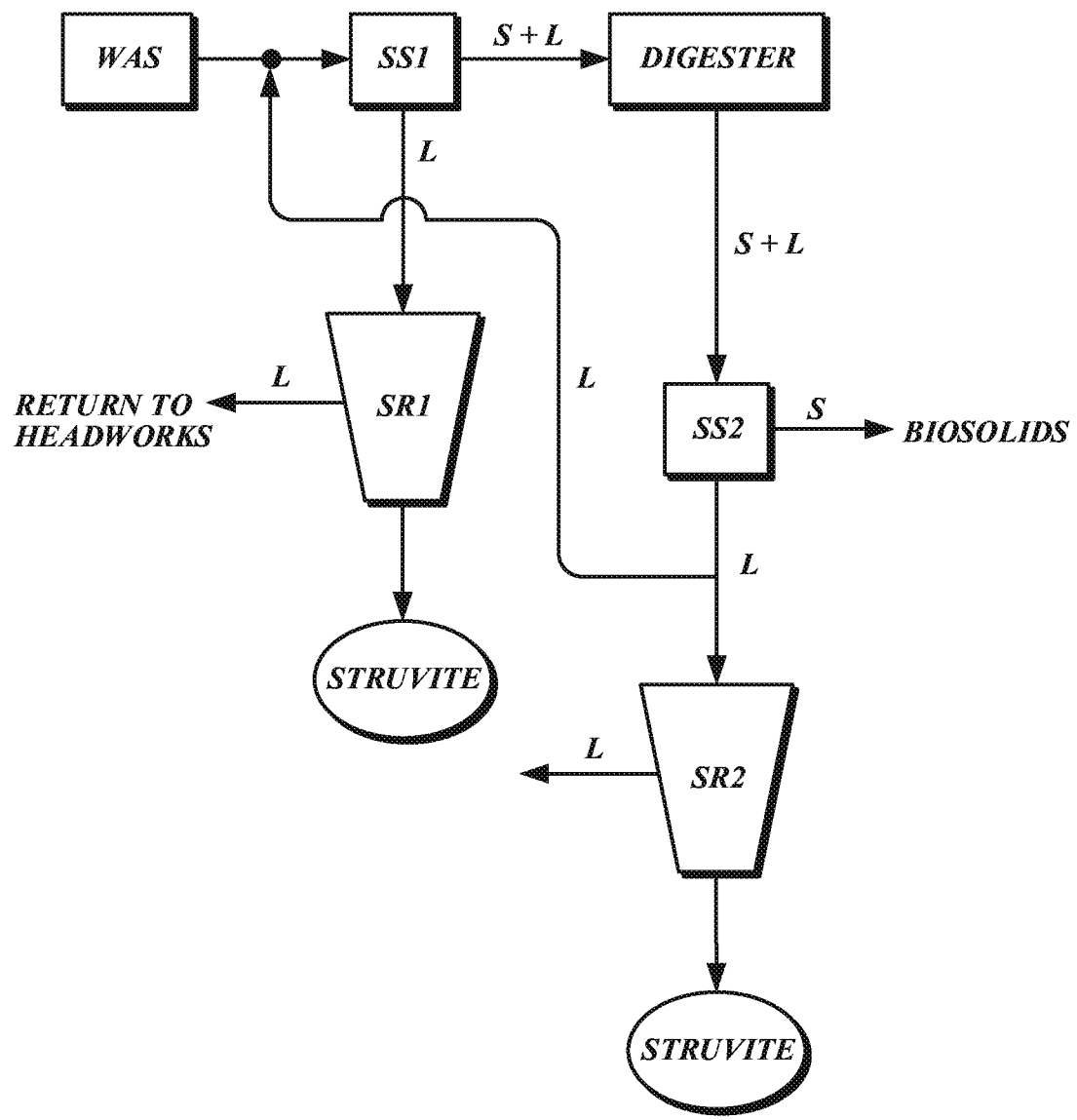
FIG. 2 is a schematic illustration of a representative method of the invention for treating wastewater and producing inorganic phosphorus.
Figure 3:
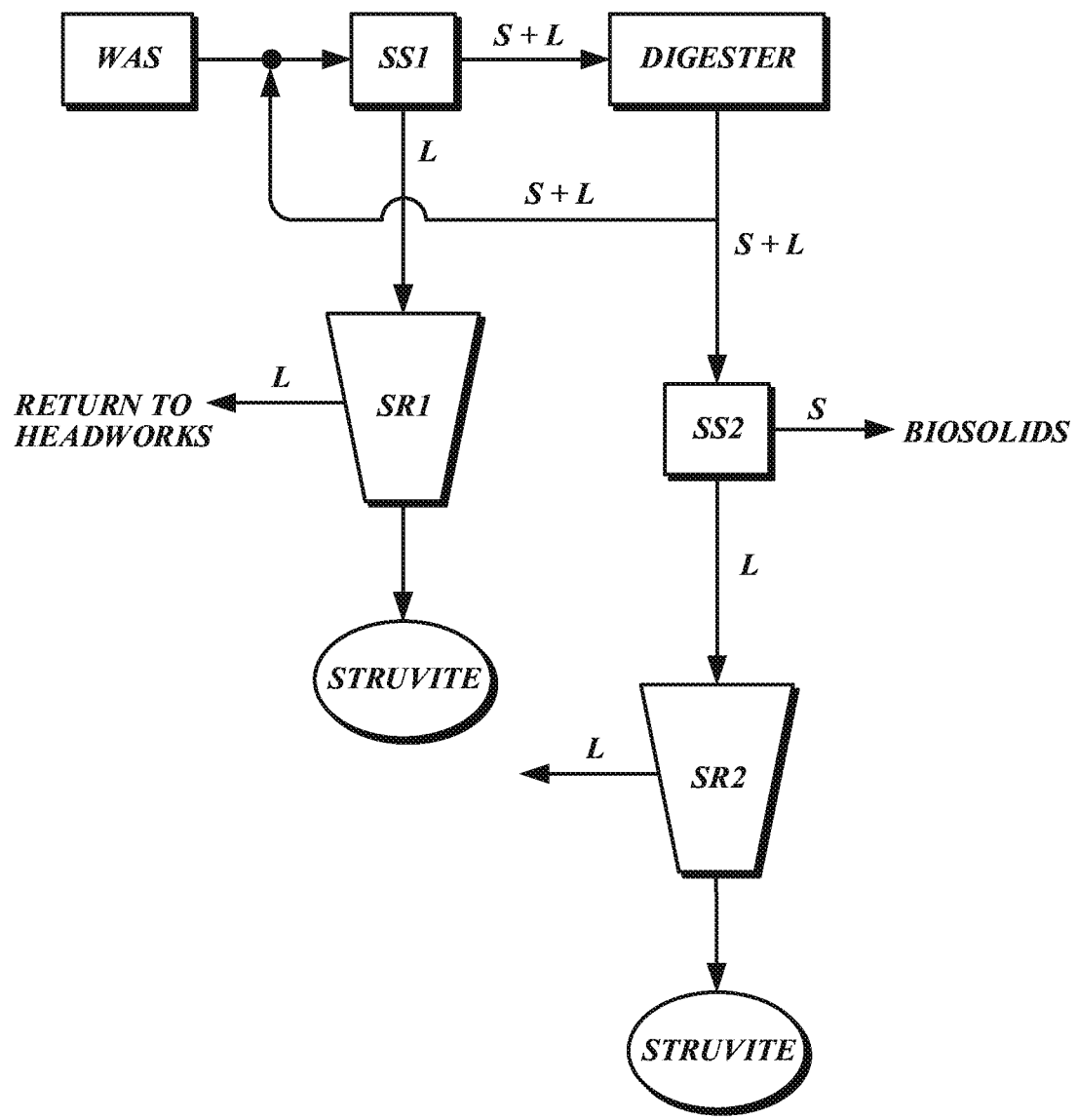
FIG. 3 is a schematic illustration of a representative method of the invention for treating wastewater and producing inorganic phosphorus.
Figure 4:
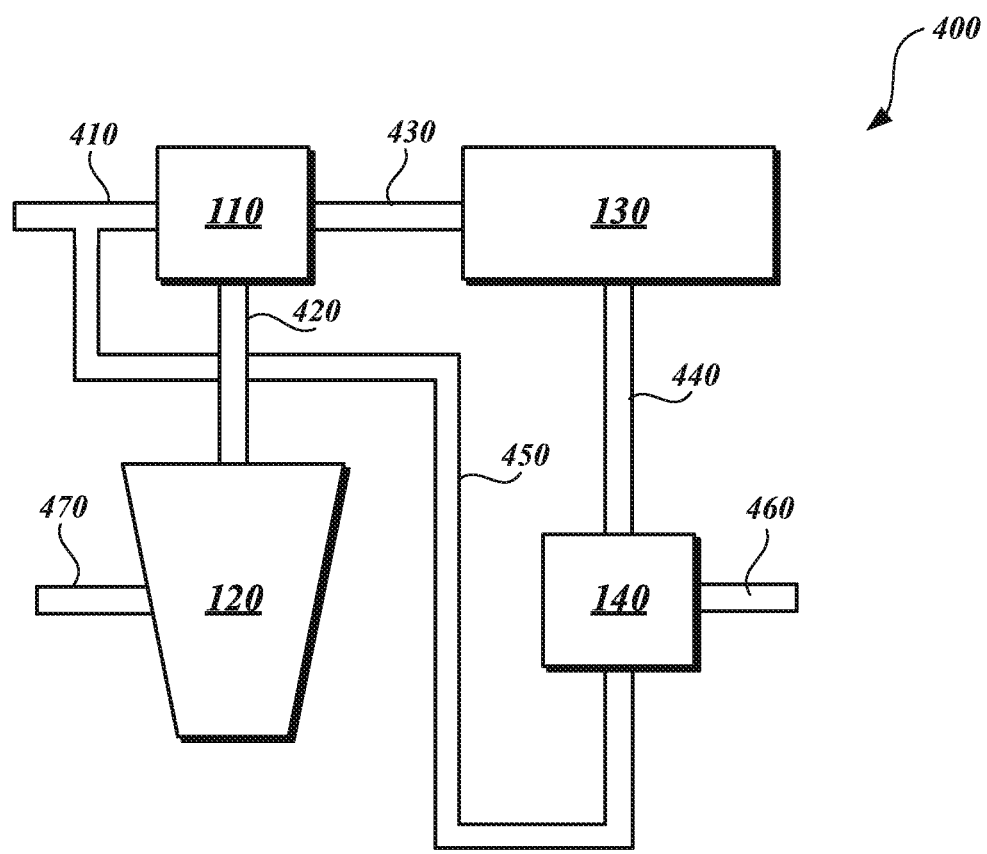
FIG. 4 is a schematic illustration of a representative system of the invention for treating wastewater and producing inorganic phosphorus.
Figure 5:
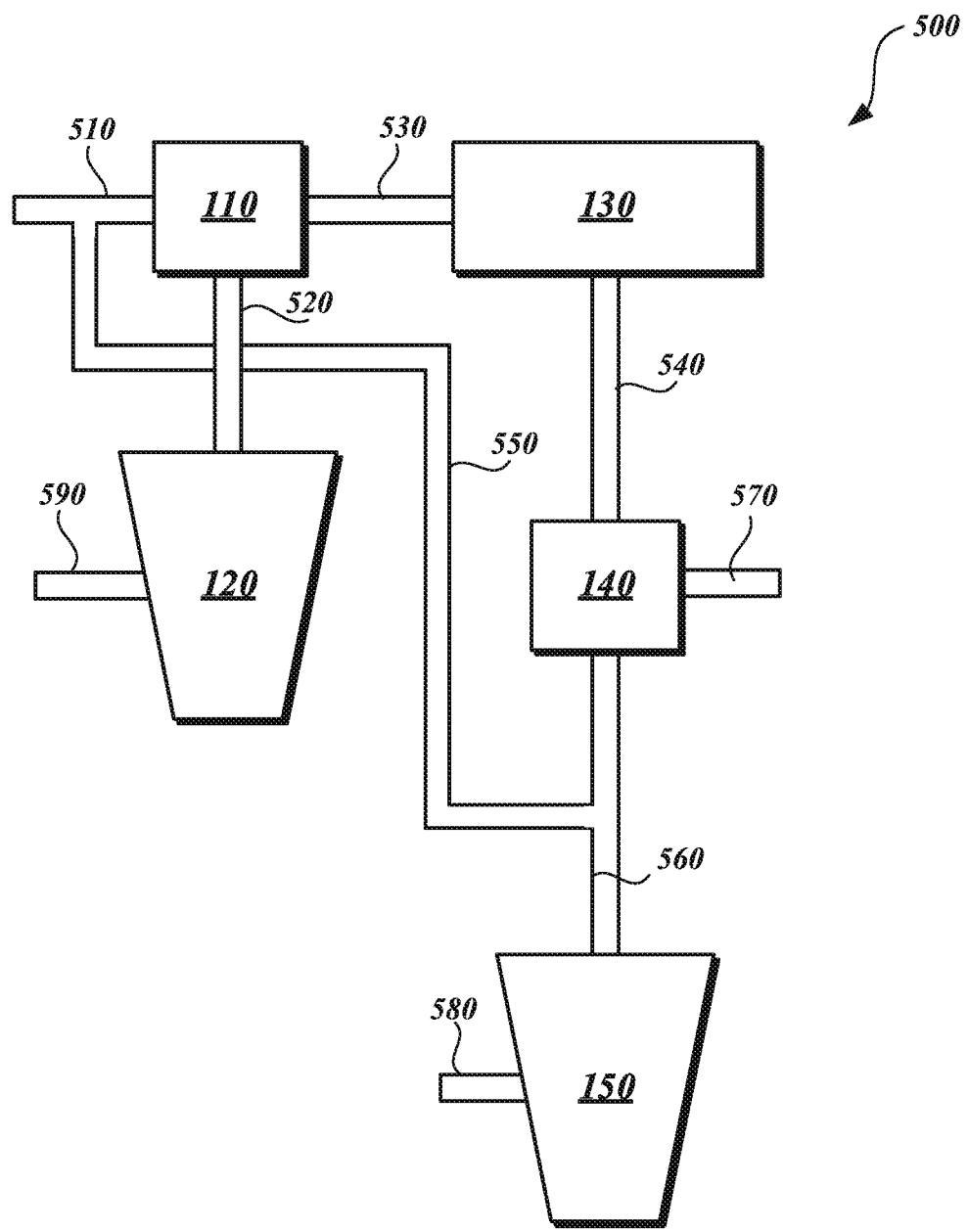
FIG. 5 is a schematic illustration of a representative system of the invention for treating wastewater and producing inorganic phosphorus.
Figure 6:
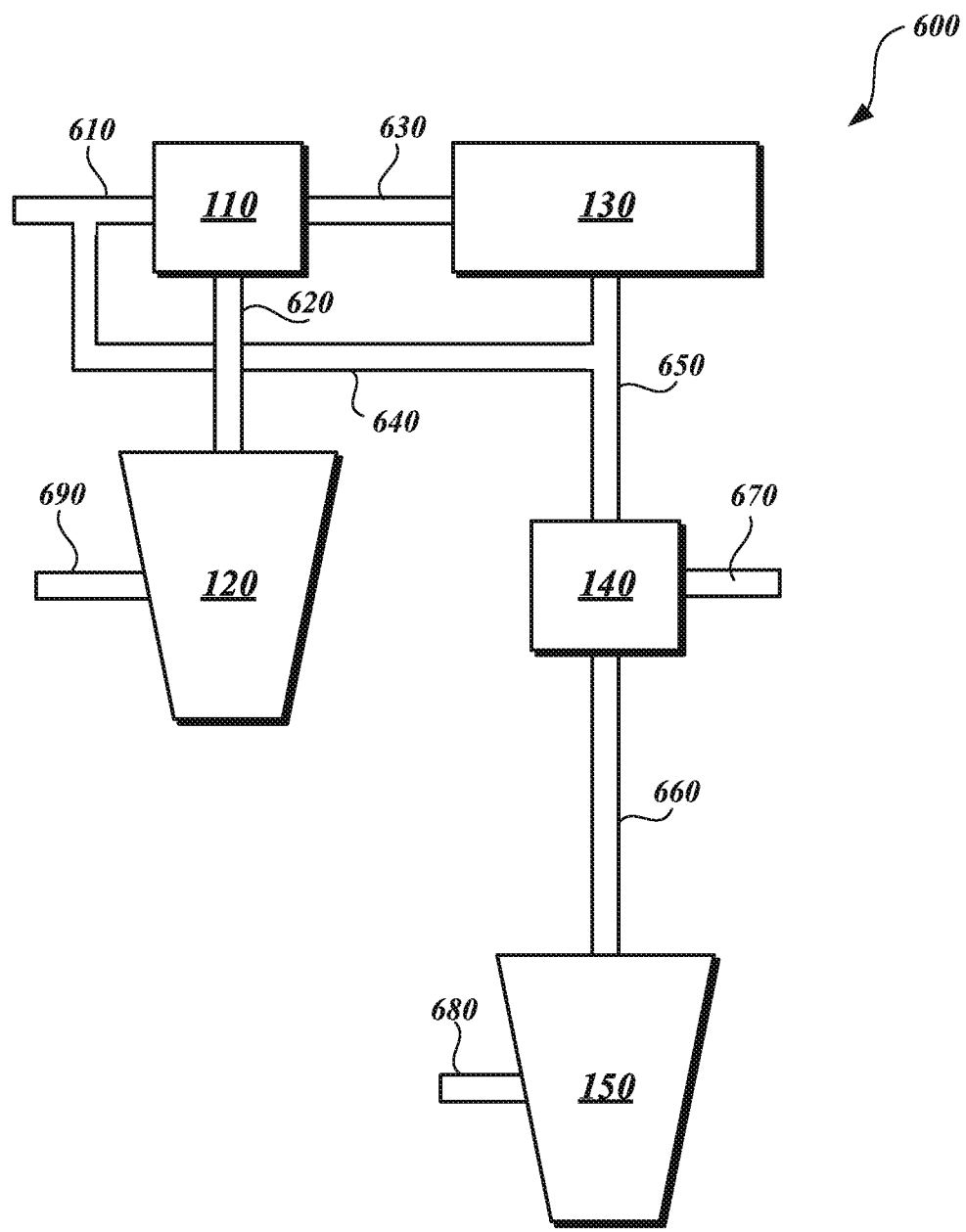
FIG. 6 is a schematic illustration of a representative system of the invention for treating wastewater and producing inorganic phosphorus.

Schematic illustrations of representative methods of the invention for treating wastewater and producing inorganic phosphorus are shown in FIGS. 1-3. Schematic illustrations of representative systems of the invention for treating wastewater and producing inorganic phosphorus are shown in FIGS. 4-6.

Referring to FIG. 1, a mixture of microorganisms containing phosphorus and magnesium are induced to release phosphorus and magnesium into liquid to provide a treated mixture that includes phosphorus and magnesium (waste-activated sludge, WAS). The treated mixture is combined with the ammonia-rich, phosphorus- and magnesium-reduced liquid that is separated from the product of anaerobic digestion described below, and the combination subjected to solids separation (SS1) to provide a phosphorus- and magnesium-reduced mixture and an ammonia-containing, phosphorus- and magnesium-rich liquid.

The phosphorus- and magnesium-reduced mixture (S+L) is subjected to anaerobic digestion, where ammonia is released, to provide an ammonia-rich, phosphorus- and magnesium-reduced mixture containing suspended solids in liquid (S+L). At this point substantially no combination of phosphorus and magnesium occurs because of the relatively low concentration of each and because the pH is low.

Ammonia-rich, phosphorus- and magnesium-reduced liquid (L) and biosolids (S) are separated from the ammonia-rich, phosphorus- and magnesium-reduced mixture by solids separation (SS2). Solids separation can be achieved by a variety of conventional means including gravity belts, filters, and centrifuges. The biosolids are removed from the system.

As noted above, the ammonia-rich, phosphorus- and magnesium-reduced liquid is combined with the treated mixture and subjected to solid separations (SS1) to provide an ammonia-containing, phosphorus- and magnesium-rich liquid (L) that is conducted to the inorganic phosphorus reactor (SR) where inorganic phosphorus is formed. There, magnesium is optionally added, if necessary, and pH is optionally adjusted (e.g., addition of sodium hydroxide or other suitable pH booster), if necessary, to provide inorganic phosphorus. The inorganic phosphorus (e.g., struvite) is collected from the reactor and liquid from the reactor is optionally conducted to the process headworks. The solids separated from the ammonia-containing, phosphorus- and magnesium-rich liquid are conducted to the digester.

Thus, in one embodiment, the method includes the following steps:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to an inorganic phosphorus reactor to provide inorganic phosphorus;

(d) anaerobically treating the phosphorus- and magnesium-reduced mixture to provide an ammonia-rich, phosphorus- and magnesium-reduced mixture; and (e) separating the ammonia-rich, phosphorus- and magnesium-reduced mixture to provide biosolids and an ammonia-rich, phosphorus- and magnesium-reduced liquid; and (f) conducting the ammonia-rich, phosphorus- and magnesium-reduced liquid to the treated mixture prior to solids separation in step (b).

In one embodiment, the method further comprises adjusting the pH of the contents of the inorganic phosphorus reactor. In one embodiment, the method further comprises adding magnesium to the contents of the inorganic phosphorus reactor. In one embodiment, the method further comprises conducting liquid from the inorganic phosphorus reactor to the process headworks.

A second embodiment of the invention is illustrated schematically in FIG. 2. Referring to FIG. 2, a mixture of microorganisms containing phosphorus and magnesium are induced to release phosphorus and magnesium into liquid to provide a treated mixture that includes phosphorus and magnesium (waste-activated sludge, WAS). The treated mixture is combined with a portion of the ammonia-rich, phosphorus- and magnesium-reduced liquid that is separated from the product of anaerobic digestion described below, and the combination subjected to solids separation (SS1) to provide a phosphorus- and magnesium-reduced mixture and an ammonia-containing, phosphorus- and magnesium-rich liquid.

The phosphorus- and magnesium-reduced mixture is subjected to anaerobic digestion, where ammonia is released, to provide an ammonia-rich, phosphorus- and magnesium-reduced mixture containing suspended solids in liquid (S+L). At this point substantially no combination of phosphorus and magnesium occurs because of the relatively low concentration of each and because the pH is low.

Ammonia-rich, phosphorus- and magnesium-reduced liquid (L) is separated from the ammonia-rich, phosphorus- and magnesium-reduced mixture by solids separation (SS2) to provide biosolids (S). Solids separation can be achieved by a variety of conventional means including gravity belts, filters, and centrifuges. The biosolids are removed from the system.

In this embodiment, it is appreciated that the amount of ammonia necessary for inorganic phosphorus formation in the inorganic phosphorus reactor (SR1) may be less than the amount of ammonia present in the ammonia-rich, phosphorus- and magnesium-reduced liquid produced from the second solids separator (SS2). Accordingly, in this embodiment, only a portion of the ammonia-rich, phosphorus- and magnesium-reduced liquid produced from the second solids separator (SS2) is conducted to the treated mixture prior to solids separation (SS1). The remainder of the stream can be conducted from the system, further treated by, for example, being conducted to a second inorganic phosphorus reactor (SR2), or conducted to the system headworks. Magnesium is optionally added, if necessary, and pH is optionally adjusted (e.g., addition of sodium hydroxide or other suitable pH booster), if necessary, to provide inorganic phosphorus.

As noted above, a portion of the ammonia-rich, phosphorus- and magnesium-reduced liquid from the second solids separator (SS2) and the treated mixture from step (a) are subjected to solid separations (SS1) to provide an ammonia-containing, phosphorus- and magnesium-rich liquid (L) that is conducted to the inorganic phosphorus reactor (SR1) where inorganic phosphorus is formed. There, magnesium is optionally added, if necessary, and pH is optionally adjusted (e.g., addition of sodium hydroxide or other suitable pH booster), if necessary, to provide inorganic phosphorus. The inorganic phosphorus (e.g., struvite) is collected from the reactor and liquid from the reactor is optionally conducted to the process headworks. The solids separated from the ammonia-containing, phosphorus- and magnesium-rich liquid are conducted to the digester.

Thus, in one embodiment, the method includes the following steps:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to an inorganic phosphorus reactor to provide inorganic phosphorus; (d) anaerobically treating the phosphorus- and magnesium-reduced mixture to provide an ammonia-rich, phosphorus- and magnesium-reduced mixture;

(e) separating the ammonia-rich, phosphorus- and magnesium-reduced mixture to provide biosolids and an ammonia-rich, phosphorus- and magnesium-reduced liquid;

(f) conducting at least a first portion the ammonia-rich, phosphorus- and magnesium-reduced liquid to the treated mixture prior to solids separation in step (b); and (g) optionally conducting at least a second portion of the ammonia-rich, phosphorus- and magnesium-reduced liquid to a second inorganic phosphorus reactor to provide inorganic phosphorus.

In certain embodiments, the method further comprises adjusting the pH of the contents of one or both of the inorganic phosphorus reactors. In certain embodiments, the method further comprises adding magnesium to the contents of one or both of the inorganic phosphorus reactors. In certain embodiments, the method further comprises conducting liquid from one or both of the inorganic phosphorus reactors to the process headworks.

A third embodiment of the invention is illustrated schematically in FIG. 3. Referring to FIG. 3, a mixture of microorganisms containing phosphorus and magnesium are induced to release phosphorus and magnesium into liquid to provide a treated mixture that includes phosphorus and magnesium (waste-activated sludge, WAS). The treated mixture and a portion of the ammonia-rich, phosphorus- and magnesium-reduced mixture, which is the product of anaerobic digestion described below, is subjected to solids separation (SS1) to provide a phosphorus- and magnesium-reduced mixture and an ammonia-containing, phosphorus- and magnesium-rich liquid.

In this embodiment, it is appreciated that the amount of ammonia necessary for inorganic phosphorus formation in the inorganic phosphorus reactor (SR1) may be less than the amount of ammonia present in the ammonia-rich, phosphorus- and magnesium-reduced mixture produced from the digester. Accordingly, in this embodiment, a portion of the ammonia-rich, phosphorus- and magnesium-reduced mixture produced from the digester and the treated mixture are subjected to solids separation (SS1). The remainder of the ammonia-rich, phosphorus- and magnesium-reduced mixture may be subject to solids separation (SS2) to provide an ammonia-rich, phosphorus- and magnesium-reduced liquid (L) and biosolids (S). Solids separation can be achieved by a variety of conventional means including gravity belts, filters, and centrifuges. The biosolids are removed from the system.

The ammonia-rich, phosphorus- and magnesium-reduced liquid can be conducted from the system, further treated by, for example, being conducted to a second inorganic phosphorus reactor (SR2), or conducted to the system headworks. Magnesium is optionally added, if necessary, and pH is optionally adjusted (e.g., addition of sodium hydroxide or other suitable pH booster), if necessary, to provide inorganic phosphorus in the second inorganic phosphorus reactor.

As noted above, a portion of the ammonia-rich, phosphorus- and magnesium-reduced mixture from the digester and the treated mixture from step (a) are subjected to solid separations (SS1) to provide an ammonia-containing, phosphorus- and magnesium-rich liquid (L) that is conducted to the inorganic phosphorus reactor (SR1) where inorganic phosphorus is formed. There, magnesium is optionally added, if necessary, and pH is optionally adjusted (e.g., addition of sodium hydroxide or other suitable pH booster), if necessary, to provide inorganic phosphorus. The inorganic phosphorus (e.g., struvite) is collected from the reactor and liquid from the reactor is optionally conducted to the process headworks. The solids separated from the ammonia-containing, phosphorus- and magnesium-rich liquid are conducted to the digester.

Thus, in one embodiment, the method includes the following steps:

(a) inducing a mixture of microorganisms containing phosphorus and magnesium to release phosphorus and magnesium to provide a treated mixture that includes phosphorus and magnesium;

(b) subjecting the treated mixture to solids separation to provide a phosphorus- and magnesium-reduced mixture and an ammonia-containing, phosphorus- and magnesium-rich liquid;

(c) conducting the ammonia-containing, phosphorus- and magnesium-rich liquid to a first inorganic phosphorus reactor to provide inorganic phosphorus;

(d) anaerobically treating the phosphorus- and magnesium-reduced mixture to provide an ammonia-rich, phosphorus- and magnesium-reduced mixture;

(e) conducting at least a first portion of the ammonia-rich, phosphorus- and magnesium-reduced mixture to the treated mixture prior to solids separation in step (b);

(f) separating at least a second portion of the ammonia-rich, phosphorus- and magnesium-reduced mixture to provide biosolids and an ammonia-rich, phosphorus- and magnesium-reduced liquid; and (g) optionally conducting the ammonia-rich, phosphorus- and magnesium-reduced liquid to a second inorganic phosphorus reactor to provide inorganic phosphorus.

In certain embodiments, the method further comprises adjusting the pH of the contents of one or both of the inorganic phosphorus reactors. In certain embodiments, the method further comprises adding magnesium to the contents of one or both of the inorganic phosphorus reactors. In certain embodiments, the method further comprises conducting liquid from one or both of the inorganic phosphorus reactors to the process headworks.

In another aspect, the invention provides systems for treating wastewater and producing inorganic phosphorus are provided. The systems are effective in carrying out the methods of the invention. In the systems, the highly alkaline ammonia-rich, phosphorus- and magnesium reduced product produced from anaerobic digestion is conducted to and combined with the phosphorus- and magnesium-containing treated mixture produced from microorganism phosphorus release prior to the first solids separation. As noted above, the introduction of this alkaline material to the treated mixture satisfies or significantly reduces the alkaline demand prior to the first solids separation and eliminates or significantly reduces nuisance struvite formation in downstream processing.

A representative system of the invention is illustrated schematically in FIG. 4. Referring to FIG. 4, system 400 comprises:

(a) a first conduit 410 for introducing a material into a first solids separator 110;

(b) a first solids separator 110 for separating the material into a first liquid and a first mixture;

(c) an inorganic phosphorus reactor 120 for making inorganic phosphorus;

(d) a second conduit 420 intermediate the first solids separator 110 and the inorganic phosphorus reactor 120 for conducting the first liquid from the first solids separator to the inorganic phosphorus reactor;

(e) a digester 130 for anaerobically treating the first mixture to provide a second mixture;

(f) a third conduit 430 intermediate the first solids separator 110 and the digester 130 for conducting the first mixture from the first solids separator to the digester;

(g) a second solids separator 140 for separating the second mixture into a second liquid and biosolids;

(h) a fourth conduit 440 intermediate the digester 130 and the second solids separator 140 for conducting the second mixture from the digester to the second solids separator; and (i) a fifth conduit 450 intermediate the second solids separator 140 and the first conduit 410 for conducting the second liquid to the first conduit to combine the second liquid with the material.

Second solids separator 140 further includes conduit 450 for conducting biosolids from the system.

Inorganic phosphorus reactor 120 further includes conduit 470 for directing inorganic phosphorus reactor liquid output from the reactor.

A second representative system of the invention is illustrated schematically in FIG. 5. Referring to FIG. 5, system 500 comprises:

(a) a first conduit 510 for introducing a material into a first solids separator 110;

(b) a first solids separator 110 for separating the material into a first liquid and a first mixture;

(c) a first inorganic phosphorus reactor 120 for making inorganic phosphorus;

(d) a second conduit 520 intermediate the first solids separator 110 and the first inorganic phosphorus reactor 120 for conducting the first liquid from the first solids separator to the first inorganic phosphorus reactor;

(e) a digester 130 for anaerobically treating the first mixture to provide a second mixture;

(f) a third conduit 530 intermediate the first solids separator 110 and the digester 130 for conducting the first mixture from the first solids separator to the digester;

(g) a second solids separator 140 for separating the second mixture into a second liquid and biosolids;

(h) a fourth conduit 540 intermediate the digester 130 and the second solids separator 140 for conducting the second mixture from the digester to the second solids separator;

(i) a second inorganic phosphorus reactor 150 for making inorganic phosphorus;

(j) a fifth conduit 550 intermediate the second solids separator 140 and the first conduit 510 for conducting a first portion of the second liquid from the second solids separator to the first conduit to combine the second liquid with the material; and (k) a sixth conduit 560 intermediate the second solids separator 140 and the second inorganic phosphorus reactor 150 for conducting a second portion of the second liquid to the second inorganic phosphorus reactor.

Second solids separator 140 further includes conduit 570 for conducting biosolids from the system.

Inorganic phosphorus reactors 120 and 150 further include conduits 590 and 580, respectively, for directing inorganic phosphorus reactor liquid output from the reactor.

A third representative system of the invention is illustrated schematically in FIG. 6. Referring to FIG. 6, system 600 comprises:

(a) a first conduit 610 for introducing a material into a first solids separator 110;

(b) a first solids separator 110 for separating the material into a first liquid and a first mixture;

(c) a first inorganic phosphorus reactor 120 for making inorganic phosphorus;

(d) a second conduit 620 intermediate the first solids separator 110 and the first inorganic phosphorus reactor 120 for conducting the first liquid from the first solids separator to the first inorganic phosphorus reactor;

(e) a digester 130 for anaerobically treating the first mixture to provide a second mixture;

(f) a third conduit 630 intermediate the first solids separator 110 and the digester 130 for conducting the first mixture from the first solids separator to the digester;

(g) a fourth conduit 640 intermediate the digester 130 and the first conduit 610 for conducting a first portion of the second mixture from the digester to the first conduit to combine the second mixture with the material;

(h) a second solids separator 140 for separating a second portion of the second mixture into a second liquid and biosolids;

(i) a fifth conduit 650 intermediate the digester 130 and the second solids separator 140 for conducting the second portion of the second mixture from the digester to the second solids separator;

(j) a second inorganic phosphorus reactor 150 for making inorganic phosphorus; and (k) a sixth conduit 660 intermediate the second solids separator 140 and the second inorganic phosphorus reactor 150 for conducting the second liquid to the second inorganic reactor.

Second solids separator 140 further includes conduit 670 for conducting biosolids from the system.

Inorganic phosphorus reactors 120 and 150 further include conduits 690 and 680, respectively, for directing inorganic phosphorus reactor liquid output from the reactor.

In the systems described herein, it will be appreciated that the inlet ends of conduits can connect either to a source conduit or to the system component (e.g., digester) from which the source conduit is flowing, and that the outlet ends of conduits can connect either to a destination conduit or to the system into which the destination conduit flows. As described herein, when one configuration is stated (e.g., a conduit connecting on its inlet end to a source conduit) it is also intended that it include the other (that same conduit connecting on its inlet end to the equipment from which the specified source conduit is flowing).

In the methods and systems of the invention, ammonia is combined with phosphorus and magnesium to produce inorganic phosphorus (e.g., struvite). It will be appreciated that the nature of the ammonia will depend on the pH of the environment of the process streams in which the ammonia is present. For example, at lower pH, ammonia will be in the form of ammonium ($NH_4^+$) and can be associated with counterions (e.g., sulfate, $SO_4^{2-}$).

While the preferred embodiment of the invention has been illustrated and described, it will be appreciated that various changes can be made therein without departing from the spirit and scope of the invention.

What is claimed is:

1. A system for producing inorganic phosphorus from wastewater, comprising:
    (a) a first conduit for introducing a material into a first solids separator;
    (b) a first solids separator for separating the material into a first liquid and a first mixture;
    (c) an inorganic phosphorus reactor for making inorganic phosphorus;
    (d) a second conduit intermediate the first solids separator and the inorganic phosphorus reactor for conducting the first liquid from the first solids separator to the inorganic phosphorus reactor;
    (e) a digester for anaerobically treating the first mixture to provide a second mixture;
    (f) a third conduit intermediate the first solids separator and the digester for conducting the first mixture from the first solids separator to the digester;
    (g) a second solids separator for separating the second mixture into a second liquid and biosolids;
    (h) a fourth conduit intermediate the digester and the second solids separator for conducting the second mixture from the digester to the second solids separator; and
    (i) a fifth conduit intermediate the second solids separator and the first conduit for conducting the second liquid to the first conduit to combine the second liquid with the material.

2. The system of claim 1, wherein the material is waste-activated sludge.

3. The system of claim 1, wherein the inorganic phosphorus is a magnesium ammonium phosphate hexahydrate.

4. A system for producing inorganic phosphorus from wastewater, comprising:
    (a) a first conduit for introducing a material into a first solids separator;
    (b) a first solids separator for separating the material into a first liquid and a first mixture;
    (c) a first inorganic phosphorus reactor for making inorganic phosphorus;

(d) a second conduit intermediate the first solids separator and the first inorganic phosphorus reactor for conducting the first liquid from the first solids separator to the first inorganic phosphorus reactor;
(e) a digester for anaerobically treating the first mixture to provide a second mixture;
(f) a third conduit intermediate the first solids separator and the digester for conducting the first mixture from the first solids separator to the digester;
(g) a second solids separator for separating the second mixture into a second liquid and biosolids;
(h) a fourth conduit intermediate the digester and the second solids separator for conducting the second mixture from the digester to the second solids separator;
(i) a second inorganic phosphorus reactor for making inorganic phosphorus;
(j) a fifth conduit intermediate the second solids separator and the first conduit for conducting a first portion of the second liquid from the second solids separator to the first conduit to combine the second liquid with the material; and
(k) a sixth conduit intermediate the second solids separator and the second inorganic phosphorus reactor for conducting a second portion of the second liquid to the second inorganic phosphorus reactor.

5. The system of claim 4, wherein the material is waste-activated sludge.

6. The system of claim 4, wherein the inorganic phosphorus is a magnesium ammonium phosphate hexahydrate.

7. A system for producing inorganic phosphorus from wastewater, comprising:
(a) a first conduit for introducing a material into a first solids separator;
(b) a first solids separator for separating the material into a first liquid and a first mixture;
(c) a first inorganic phosphorus reactor for making inorganic phosphorus;
(d) a second conduit intermediate the first solids separator and the first inorganic phosphorus reactor for conducting the first liquid from the first solids separator to the first inorganic phosphorus reactor;
(e) a digester for anaerobically treating the first mixture to provide a second mixture;
(f) a third conduit intermediate the first solids separator and the digester for conducting the first mixture from the first solids separator to the digester;
(g) a fourth conduit intermediate the digester and the first conduit for conducting a first portion of the second mixture from the digester to the first conduit to combine the second mixture with the material;
(h) a second solids separator for separating a second portion of the second mixture into a second liquid and biosolids;
(i) a fifth conduit intermediate the digester and the second solids separator for conducting the second portion of the second mixture from the digester to the second solids separator;
(j) a second inorganic phosphorus reactor for making inorganic phosphorus; and
(k) a sixth conduit intermediate the second solids separator and the second inorganic phosphorus reactor for conducting the second liquid to the second inorganic reactor.

8. The system of claim 7, wherein the material is waste-activated sludge.

9. The system of claim 7, wherein the inorganic phosphorus is a magnesium ammonium phosphate hexahydrate.

* * * * *